United States Patent
Kim et al.

(10) Patent No.: US 10,956,774 B2
(45) Date of Patent: Mar. 23, 2021

(54) ELECTRONIC DEVICE FOR ACQUIRING IMAGE USING PLURALITY OF CAMERAS AND METHOD FOR PROCESSING IMAGE USING THE SAME

(71) Applicant: Samsung Electronics Co., Ltd., Gyeonggi-do (KR)

(72) Inventors: Jihak Kim, Incheon (KR); Dongwoo Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 16/044,638

(22) Filed: Jul. 25, 2018

(65) Prior Publication Data

US 2019/0034756 A1 Jan. 31, 2019

(30) Foreign Application Priority Data

Jul. 27, 2017 (KR) .......................... 10-2017-0095468

(51) Int. Cl.
*H04N 5/232* (2006.01)
*G06K 9/62* (2006.01)
(Continued)

(52) U.S. Cl.
CPC .......... *G06K 9/6201* (2013.01); *G06T 3/4023* (2013.01); *G06T 7/11* (2017.01);
(Continued)

(58) Field of Classification Search
CPC ............. H04N 5/2258; H04N 5/23232; H04N 5/23296; H04N 5/23238; H04N 5/23258;
(Continued)

(56) References Cited

U.S. PATENT DOCUMENTS 4,560,261 A 12/1985 Ueda et al.
8,199,212 B2 6/2012 Nonaka et al.
(Continued)

FOREIGN PATENT DOCUMENTS

CN 101127829 A 2/2008
CN 101572775 A 11/2009
(Continued)

OTHER PUBLICATIONS

European Search Report dated Nov. 2, 2018.
Chinese Search Report dated Jun. 23, 2020.

*Primary Examiner* — Allahyar Kasraian
(74) *Attorney, Agent, or Firm* — Cha & Reiter, LLC.

(57) ABSTRACT

The present disclosure relates to an electronic device for acquiring images by using a plurality of cameras and a method for processing images by using the same. According to an embodiment of the present disclosure, the electronic device may comprise a first camera, a second camera including a lens assembly and a driving unit capable of changing an optic axis of the lens assembly, and a processor. The processor can receive a photographing signal for an external object; acquire a first image of the external object by using the first camera, acquire a second image of the external object by setting the lens assembly of the second camera to a first direction; acquire a third image of the external object by setting the lens assembly of the second camera to a second direction; and generate an image of the external object by synthesizing at least one part of the first image with at least one part of the second image, and synthesizing at least one other part of the first image with at least one part of the third image. Further, other various embodiments can be implemented according to the present disclosure.

20 Claims, 12 Drawing Sheets

(51) Int. Cl.
  *H04N 5/247*  (2006.01)
  *G06T 3/40*   (2006.01)
  *G06T 7/11*   (2017.01)
  *G06T 7/70*   (2017.01)
  *G06T 7/00*   (2017.01)

(52) U.S. Cl.
  CPC .................. *G06T 7/70* (2017.01); *G06T 7/97* (2017.01); *H04N 5/23238* (2013.01); *H04N 5/23258* (2013.01); *H04N 5/23267* (2013.01); *H04N 5/23277* (2013.01); *H04N 5/23287* (2013.01); *H04N 5/247* (2013.01); *G06K 2009/6213* (2013.01); *G06T 2207/20104* (2013.01)

(58) Field of Classification Search
  CPC ........... H04N 5/23287; H04N 5/23277; H04N 5/247; H04N 5/23267; G02B 13/009; G02B 15/14; G02B 15/142; G06T 2207/20221; G06T 5/50; G06T 5/002; G06T 7/11; G06T 7/55; G06T 7/70; G06T 2207/20104; G06T 3/4023; G06T 3/4053; G06T 7/97; G06T 3/4038; G06K 9/32; G06K 9/6215; G06K 2009/6213; G06K 19/00; G06K 9/6202; G06K 9/6201; G06K 9/20
  See application file for complete search history.

(56) References Cited

U.S. PATENT DOCUMENTS

| | | | |
|---|---|---|---|
| 9,674,504 B1* | 6/2017 | Salvagnini | G01S 17/023 |
| 2004/0165075 A1 | 8/2004 | Okada et al. | |
| 2006/0066723 A1* | 3/2006 | Iwase | G08B 13/19608 |
| | | | 348/169 |
| 2009/0322891 A1 | 12/2009 | Kondo et al. | |
| 2012/0075489 A1 | 3/2012 | Nishihara | |
| 2012/0162453 A1* | 6/2012 | Murayama | H04N 13/211 |
| | | | 348/208.4 |
| 2015/0131924 A1* | 5/2015 | He | G06T 3/0018 |
| | | | 382/284 |
| 2015/0145950 A1 | 5/2015 | Murphy et al. | |
| 2015/0339805 A1 | 11/2015 | Ohba et al. | |
| 2016/0028949 A1 | 1/2016 | Lee et al. | |
| 2016/0054642 A1* | 2/2016 | Takeuchi | G03B 5/02 |
| | | | 396/55 |
| 2016/0212332 A1 | 7/2016 | Tang et al. | |
| 2016/0381289 A1 | 12/2016 | Kim et al. | |
| 2018/0115692 A1* | 4/2018 | Du | H04N 5/2259 |
| 2018/0157885 A1* | 6/2018 | Gurzumar | G06K 7/10801 |
| 2018/0213130 A1* | 7/2018 | Murayama | H04N 5/2254 |

FOREIGN PATENT DOCUMENTS

| | | | | |
|---|---|---|---|---|
| JP | 59-62841 A | 4/1984 | | |
| JP | 2000-59606 A | 2/2000 | | |
| WO | WO-2017092804 A1 * | 6/2017 | | H04N 7/181 |

* cited by examiner

FIG. 7
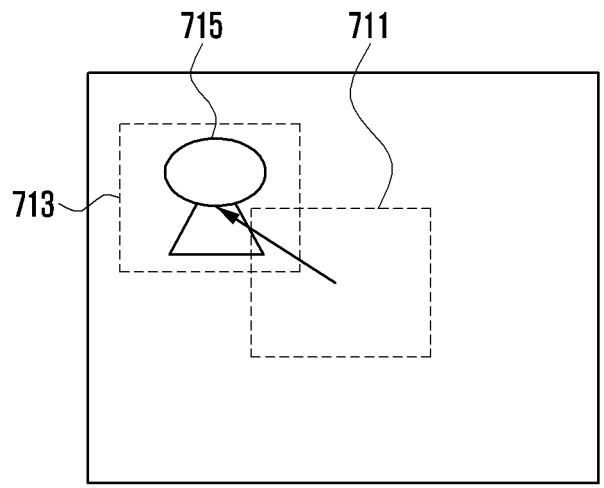
⟨710⟩
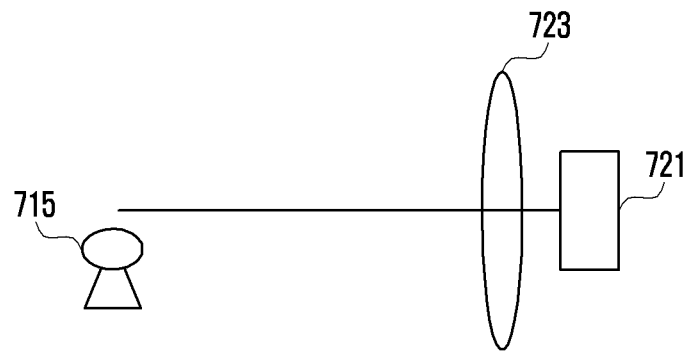
⟨720⟩
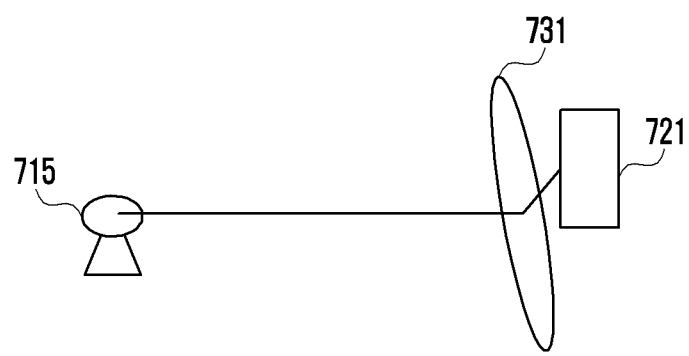
⟨730⟩

ELECTRONIC DEVICE FOR ACQUIRING IMAGE USING PLURALITY OF CAMERAS AND METHOD FOR PROCESSING IMAGE USING THE SAME

CROSS-REFERENCE TO RELATED APPLICATION(S)

This application is based on and claims priority under 35 U.S.C. § 119 to Korean Patent Application No. 10-2017-0095468, filed on Jul. 27, 2017, in the Korean Intellectual Property Office, the disclosure of which is incorporated by reference herein in its entirety.

BACKGROUND

Field

Various embodiments of the present disclosure generally relate to an electronic device for acquiring images by using a plurality of cameras and a method for processing images by using the same.

Description of Related Art

Generally, electronic devices currently available in the market may provide a camera functionality where the electronic devices generate and store images or videos of external objects. Recently, electronic devices have been equipped with a plurality of cameras (e.g., dual cameras) that can acquire photos or videos with high image quality for external objects located relatively far away from the device as well as for external objects located relatively close. Each of the plurality of cameras may have different view angles. In the case of capturing expanded images, the electronic devices can provide a zoom function by synthesizing images acquired by the plurality of cameras having the different view angles.

The above information is presented as background information only to assist with an understanding of the present disclosure. No determination has been made, and no assertion is made, as to whether any of the above might be applicable as prior art with regard to the present disclosure.

SUMMARY

However, in the case of using the aforementioned method the zoom function, the image quality of the expanded image may decline in the medium zoom range of the view angle.

To address the above problem, according to an embodiment of the present disclosure, the electronic device can generate an image of an external object by synthesizing an image of the external object acquired from a first camera with a plurality of images of the external object acquired from a second camera, where the images from the second camera correspond to different angles of a second camera lens assembly of the second camera.

According to an embodiment of the present disclosure, the electronic device may comprise a first camera, a second camera including a lens assembly and a driving unit capable of changing an optic axis of the lens assembly, and a processor. The processor can receive a photographing signal for an external object; acquire a first image of the external object by using the first camera; acquire a second image of the external object by setting the lens assembly of the second camera to a first direction; acquire a third image of the external object by setting the lens assembly of the second camera to a second direction; and generate an image of the external object by synthesizing at least one part of the first image with at least one part of the second image and by synthesizing at least one other part of the first image with at least one part of the third image.

According to an embodiment of the present disclosure, an image processing method of an electronic device by using a plurality of cameras may comprise the operations of acquiring a first image of an external object from a first camera in response to a photographing signal for the external object; acquiring a second image of the external object from a second camera, wherein the second image is acquired by setting a lens assembly of the second camera to a first direction using a driving unit included in the second camera; acquiring a third image of the external object, wherein the third image is acquired by setting the lens assembly of the second camera to a second direction; and generating an image of the external object by synthesizing at least one part of the first image with at least one part of the second image and by synthesizing at least one other part of the first image with at least one part of the third image.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 illustrates a method for adjusting a direction of a second camera lens assembly corresponding to a location of an external object according to an embodiment of the present disclosure;

DETAILED DESCRIPTION

Figure 1:
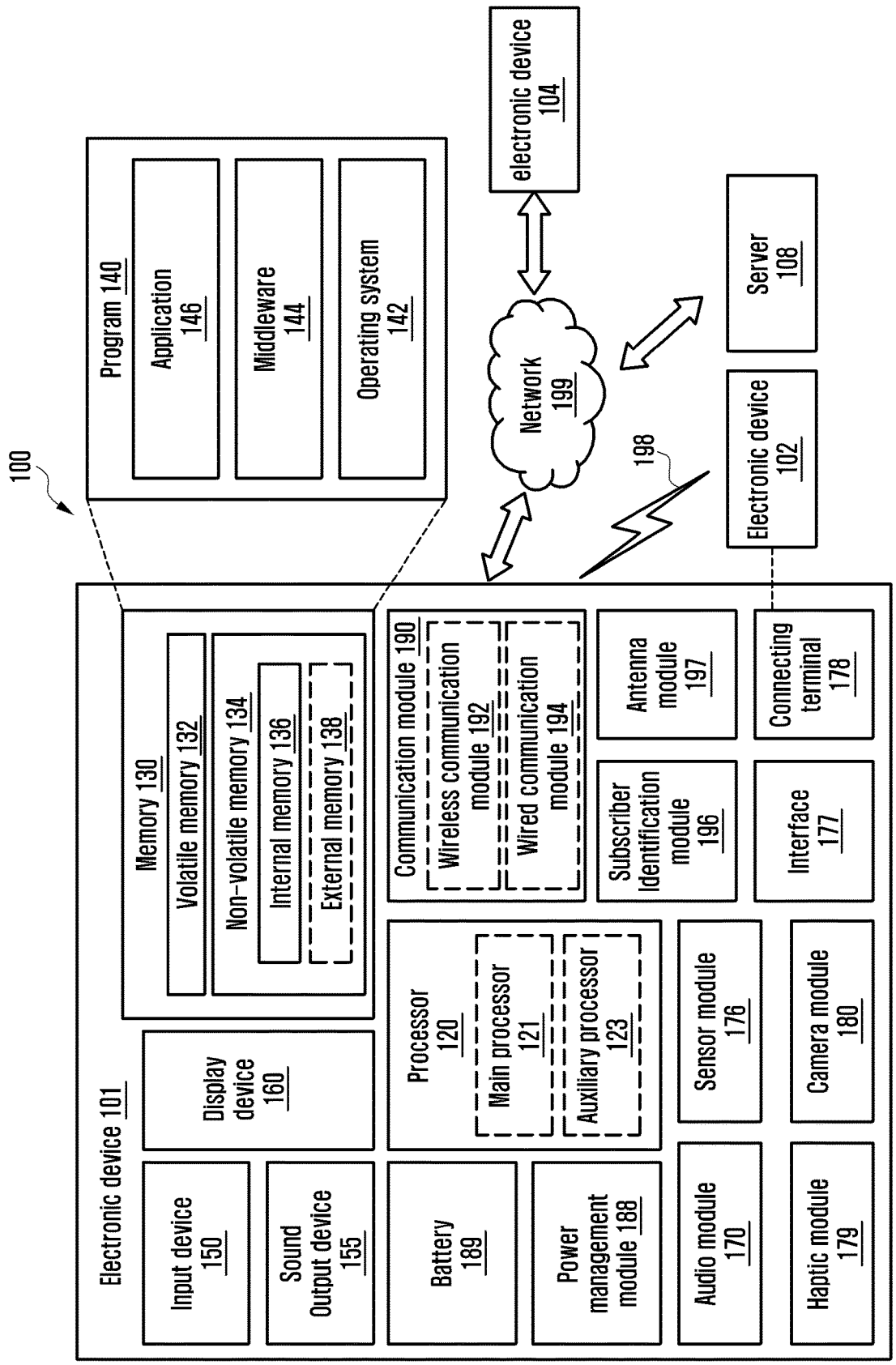
FIG. 1 is a block diagram illustrating an electronic device for acquiring images by using a plurality of cameras in a network environment according to an embodiment.

FIG. 1 is a block diagram illustrating an electronic device (101) for acquiring images by using a plurality of cameras in a network environment (100) according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121. The processor 121 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly via a wire or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly via a wire or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
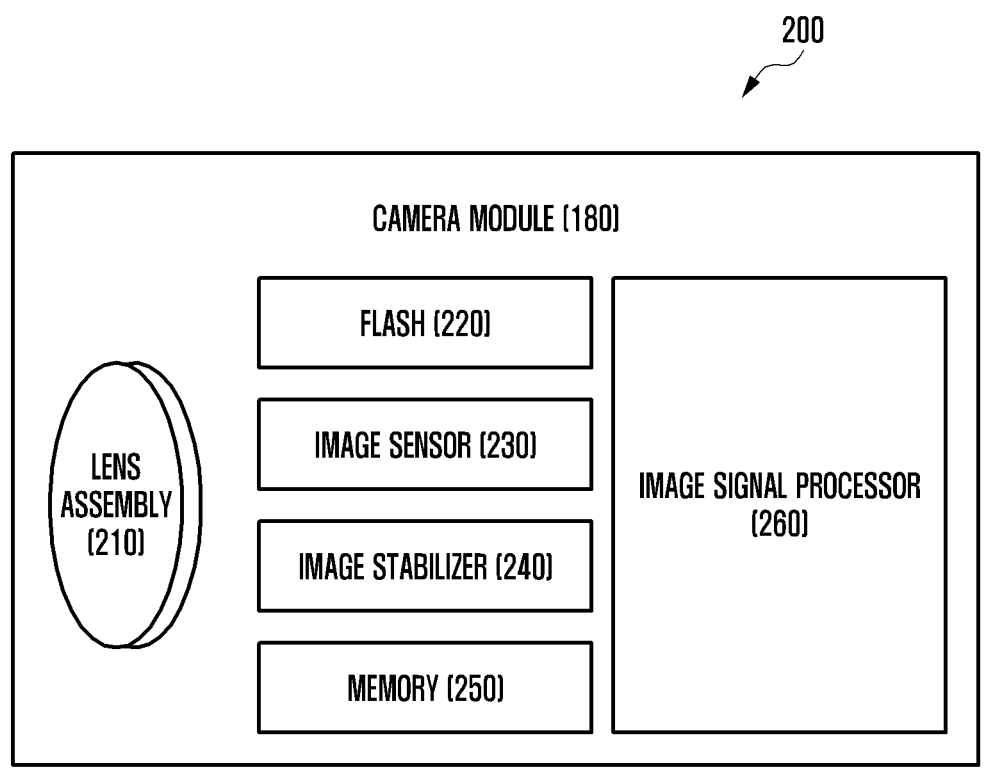
FIG. 2 is a block diagram illustrating a camera module for acquiring images by using a plurality of cameras according to an embodiment.

FIG. 2 is a block diagram (200) illustrating a camera module (180) for acquiring images by using a plurality of cameras according to an embodiment.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may be implemented as, for example, a dual camera, a 360-degree camera, or a spherical camera. Some of the plurality of lens assemblies 210 may have the same lens attributes (e.g., view angle, focal length, auto-focusing, f number, or optical zoom). Alternatively, at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to the object by converting light emitted or reflected from the object and transmitted via the lens assembly 210 into an electrical signal. According to an embodiment, the image sensor 230 may be various image sensors having different attributes, such as a RGB sensor, a black-and-white (BW) sensor, an IR sensor, or a UV sensor. In addition, the image sensor 230 may be a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 that includes the camera module 180. This allows compensating for at least part of a negative effect (e.g., image blurring) caused by the movement on the camera module 180. According to an embodiment, the image stabilizer 240 may sense the movement of the camera module 180 or the electronic device 101 using a gyro sensor (not shown) or an acceleration sensor (e.g. accelerometer) (not shown) disposed inside the camera module 180 or the electronic device 101. According to an embodiment, the image stabilizer 240 may be implemented, for example, as an optical image stabilizer.

The memory 250 may store, at least temporarily, at least part of the image obtained via the image sensor 230 for subsequent image processing. For example, if image capturing is delayed due to shutter lag or multiple images are quickly captured, the raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be further processed, for example, by the image signal processor 260. According to an embodiment, the memory 250 may be configured as at least part of the memory 130 or as a separate memory that is operated independently from the memory 130.

The image signal processor 260 may perform one or more image processing with respect to the image obtained via the image sensor 230 or the image stored in the memory 250. The one or more image processing may include, for example, depth map generation, three-dimensional (3D) modeling, panorama generation, feature point extraction, image synthesizing, image compensation (e.g., noise reduction, resolution adjustment, brightness adjustment, blurring, sharpening, or softening), etc. Additionally or alternatively, the image signal processor 260 may perform control (e.g., exposure time control or read-out timing control) with respect to at least one (e.g., the image sensor 230) of the components included in the camera module 180. The image processed by the image signal processor 260 may be stored back in the memory 250 for further processing, or may be provided to an external component (e.g., the memory 130, the display device 160, the electronic device 102, the electronic device 104, or the server 108) of the camera module 180. According to an embodiment, the image signal processor 260 may be configured as at least part of the processor 120, or as a separate processor that is operated independently from the processor 120. If the image signal processor 260 is configured as a separate processor from the processor 120, the image processed by the image signal processor 260 may be displayed, by the processor 120, via the display device 160 before or after processing.

According to an embodiment, the electronic device 101 may include a plurality of camera modules 180 having different attributes or functions. In such a case, at least one of the plurality of camera modules 180 may be, for example, a wide-angle camera and at least another of the plurality of camera modules 180 may be, for example, a telephoto camera. Similarly, at least one of the plurality of camera modules 180 may be, for example, a front camera (i.e. a camera mounted in the front face of the electronic device 101) and at least another of the plurality of camera modules 180 may be, for example, a rear camera.

Figure 3:
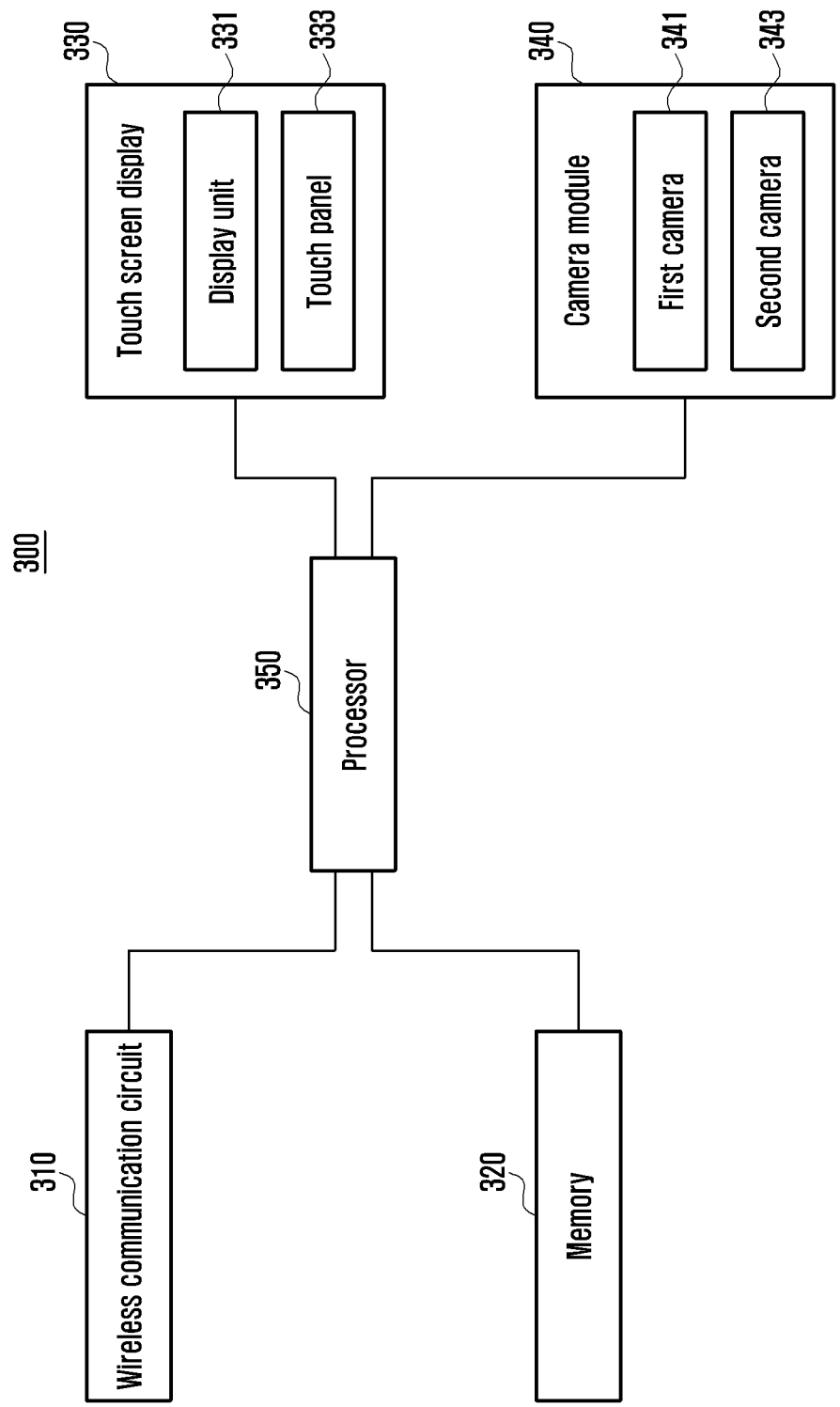
FIG. 3 is a block diagram illustrating an electronic device for acquiring images by using a plurality of cameras according to an embodiment of the present disclosure.

FIG. 3 is a block diagram illustrating an electronic device for acquiring images by using a plurality of cameras according to an embodiment of the present disclosure.

With reference to FIG. 3, the electronic device 300 (e.g., electronic device 101 of FIG. 1) may include a wireless communication circuit 310 (e.g., communication module 190 of FIG. 1), memory 320 (e.g., memory 130 of FIG. 1), touch screen display 330 (e.g., display 160 of FIG. 1), camera module 340 (e.g., camera module 180 of FIGS. 1 and 2), and processor 350 (e.g., processor 120 of FIG. 1).

According to an embodiment of the present disclosure, the wireless communication the circuit 310 (e.g., communication module 190 of FIG. 1) can form a communication channel between the electronic device 300 (e.g., electronic device 101 of FIG. 1), an external electronic device (e.g., electronic device 102 or electronic device 104 of FIG. 1), or a server (e.g., server 108 of FIG. 1).

According to an embodiment of the present disclosure, the memory 320 (e.g., memory 130 of FIG. 1) can store an operating program of the camera module 340, other programs such as various applications, and images captured by the camera module 340.

According to an embodiment of the present disclosure, the touch screen display 330 (e.g., display 160 of FIG. 1) may have a display unit 331 and a touch panel 333 integrated therein.

According to an embodiment of the present disclosure, the touch screen display 330 can display images received from the camera module 340 in a preview screen.

According to an embodiment, the touch screen display 330 can display an image of an external object synthesized by using at least one part of a first image of the external object acquired from a first camera 341 and at least one part of a second image of the external object acquired from a second camera 343. The second image may correspond to a first direction of a second camera lens assembly of the second camera 343. In addition, the synthesis may further use at least one other part of the first image and at least one part of a third image of the external object corresponding to a second direction of the second camera lens assembly.

According to an embodiment of the present disclosure, the camera module 340 (e.g., camera module 180 of FIG. 1) can transmit images to a preview screen of the display unit 331 so that the user can identify images displayed through the camera module 340. The camera module 340 can generate image data by capturing images in response to user input requesting photography.

According to an embodiment, photographing by using the first camera 341 and photographing by using the second camera 343 can be performed at the same time.

According to an embodiment, the first camera 341 can capture images having wider ranges than the second camera 343. For example, the first camera 341 can provide a view angle wider than the second camera 343.

According to an embodiment of the present disclosure, the processor 350 (e.g., processor 120 of FIG. 1) can control general operations of the electronic device 300 and signal flows between internal components of the electronic device 300, perform data processing, and control power supplies from a battery to the various components.

According to an embodiment of the present disclosure, the processor 350 can receive a photographing signal for an external object while displaying a preview screen, where the preview screen is displaying images of the external object received from the camera module 340. In response to the photographing signal, the processor 350 can acquire a first image of the external object from the first camera 341. For example, when the first camera 341 includes a wide angle lens, and the first image may be an image of the external object having a wide view angle.

According to an embodiment, the processor 350 can acquire a plurality of images of the external object from the second camera 343, each image corresponding to an angle that is being adjusted by a driving unit. For example, the processor 350 can acquire a second image of the external object corresponding to a first direction of a second camera lens assembly of the second camera 343, where the angle of the second camera lens assembly is adjusted by the driving unit. Further, the processor 350 can acquire a third image of the external object from the second camera 343 corresponding to a second direction of the second camera lens assembly, after the angle of the second camera lens assembly is adjusted again by the driving unit.

According to an embodiment, the second camera 343 may include a telephoto lens. The acquired second and third images may be images of the external object acquired through the telephoto lens and have narrower view angles than the first camera 341.

According to an embodiment, the processor 350 can determine an area of the first image acquired from the first camera 341 corresponding to at least one part of the second image and at least one part of the third image acquired from the second camera 343. The processor 350 can adjust the resolution of at least one part of the second image or at least one part of the third image. After the resolution adjustment, the processor 350 can generate an image of the external object by synthesizing at least one part of the adjusted second image or at least one part of the adjusted third image in the area of the first image corresponding to the at least one part of the second or third image.

According to an embodiment, the processor 350 can set a region of interest (ROI) in the preview screen to include the external object. For example, the ROI can be automatically recognized or be selected by a user.

According to an embodiment, if the ROI is set, the operation of acquiring second and third images may be performed for the ROI. Again, the second and third images may respectively correspond to the first and second directions of the second camera lens assembly adjusted by the driving unit. Further, if the ROI is set, the operation of synthesizing at least one part of the second image and at least one part of the third image in the area of the first image may be performed by synthesizing at least one part of the second image and at least one part of the third image corresponding to the ROI in the first image.

Figure 4:
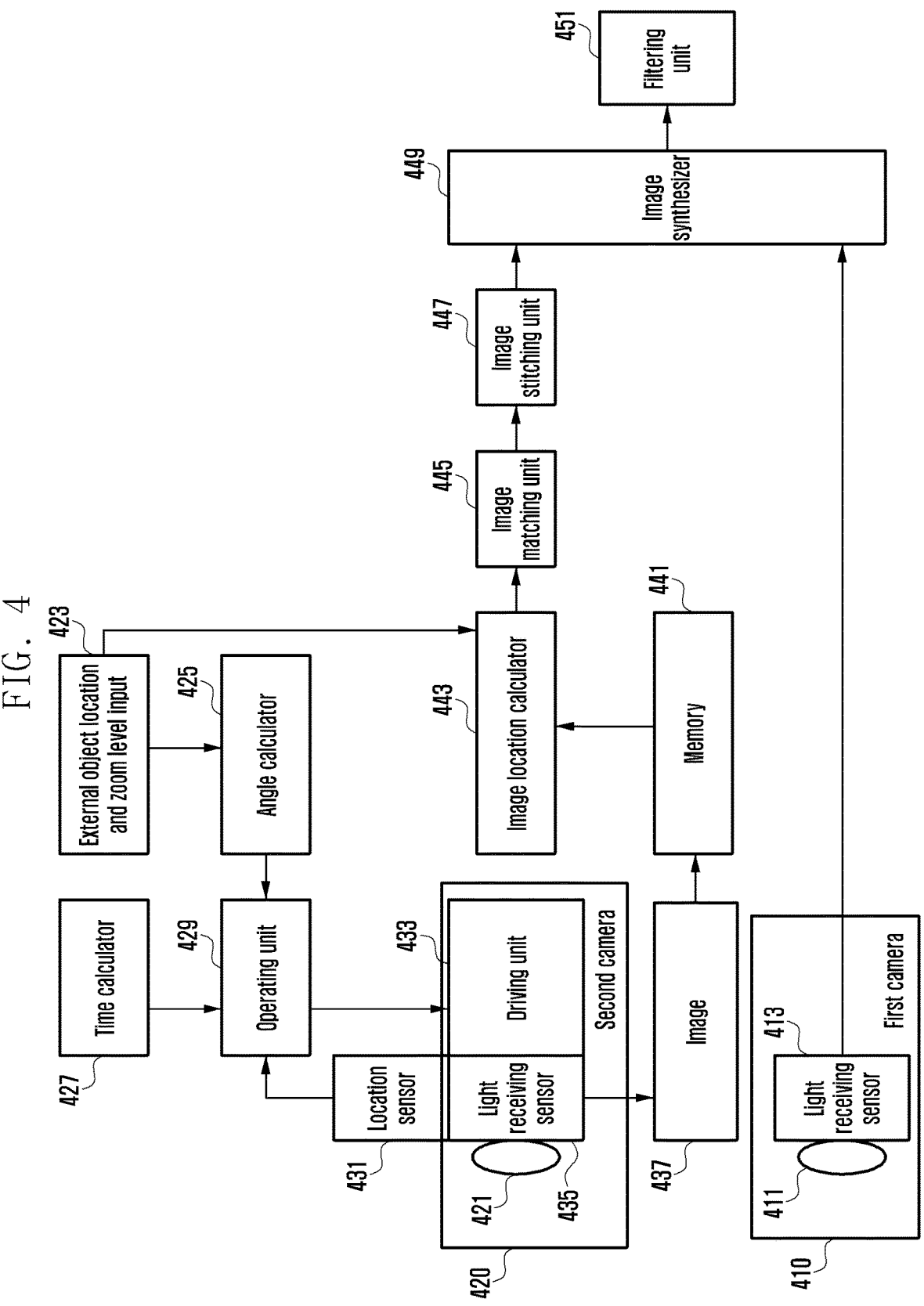
FIG. 4 is a detailed block diagram of a camera module for acquiring images by using a plurality of cameras according to an embodiment of the present disclosure.

FIG. 4 is a detailed block diagram of a camera module for acquiring images by using a plurality of camera according to an embodiment of the present disclosure.

With reference to FIG. 4, the processor (e.g., image signal processor 260 of FIG. 2 or the processor 350 of FIG. 3) can acquire an image of an external object from a first camera 410 (e.g., first camera 341 of FIG. 3) in response to an input requesting photography of the external object. For example, the first camera 410 can acquire an image of the external object based on light received by a light receiving sensor 413 through a lens 411 (e.g., wide angle lens).

According to an embodiment, in response to the input requesting photography of the external object, the processor can acquire an image of the external object from a second camera 420 (e.g., second camera 343 of FIG. 3) that corresponds to an angle set by a movement of a second camera lens assembly 421 (e.g., telephoto lens).

According to an embodiment, an angle calculator 425 can calculate a location of the second camera 420 based on a location of the external object and a zoom level 423. The angle calculator 425 can transmit the calculated location of the second camera 420 to an operating unit 429.

According to an embodiment, a time calculator 427 can calculate time so that the second camera lens assembly 421 can move during a read-out time of an image sensor of the second camera 420 (e.g., image sensor 230 of FIG. 2). For example, the operation of moving the second camera lens assembly 421 may be performed by adjusting an angle of the second camera lens assembly 421 so that the optic axis direction of the second camera lens assembly 421 changes. The time calculator 427 can transmit the calculated movement time of the second camera lens assembly 421 to the operating unit 429.

According to an embodiment, the operating unit 429 can compensate for vibration errors (i.e. errors caused by movement of the user's hand) at the angle of the second camera 420 using the location sensor 431 and control the driving unit 433 accordingly. Further, the operating unit 429 can control the driving unit 433 to move the second camera lens assembly 421 based on the movement time received from the time calculator 427.

According to an embodiment, the driving unit 433 can adjust a direction and a location of the second camera lens assembly 421 under the control of the operating unit 429. For example, the driving unit 433 can move the second camera lens assembly 421 in up/down/right/left directions. The second camera 420 can acquire an image of the external object based on light received by a light receiving sensor 435 through a lens 421 (e.g., telephoto lens) corresponding to up/down/right/left directions of the driving unit 433.

According to an embodiment, the driving unit 433 can store an image 437 of the external object acquired based on the adjusted direction and location of the second camera lens assembly 421 in a memory 441 (e.g., memory 250 of FIG. 2). The image 437 of the external object may include a plurality of images of the external object acquired corresponding to the different directions and locations of the second camera lens assembly 421.

According to an embodiment, the driving unit 433 may include an optical image stabilizer (OIS) (e.g., image stabilizer 240 of FIG. 2). For example, the processor can change the optic axis direction of the second camera lens assembly 421 by adjusting an angle of the second camera lens assembly 421 using the optical image stabilizer.

According to an embodiment, an image location calculator 443 can calculate a location of the image 437. For example, the image location calculator 443 can determine the location of the image 437 acquired from the second camera within an area of the image acquired by the first camera 410.

For example, as shown in FIG. 3, the image of the external object acquired from the first camera 410 may be a wide angle image including the external object, and the image of the external object acquired from the second camera 420 may be a telephoto image acquired by zooming in on the external object. The image location calculator 443 can determine the location of the telephoto image within the wide angle image.

According to an embodiment, an image matching unit 445 can scale down the image 437 acquired by the second camera 420 and match various images captured by the second camera 420 based on the location determined by the image location calculator 443.

According to an embodiment, an image stitching unit 447 can generate an image by combining the matched images.

According to an embodiment, an image synthesizer 449 can synthesize the image acquired by the first camera 410 and the image combined by the image stitching unit 447.

According to an embodiment, a filtering unit 451 can remove processing artifacts such as boundaries and/or noise in the image by filtering the image synthesized by the image synthesizer 449. In addition, the filtering unit may compensate blur caused by a movement of the external object or the hand of the user holding the electronic device.

Figure 5:
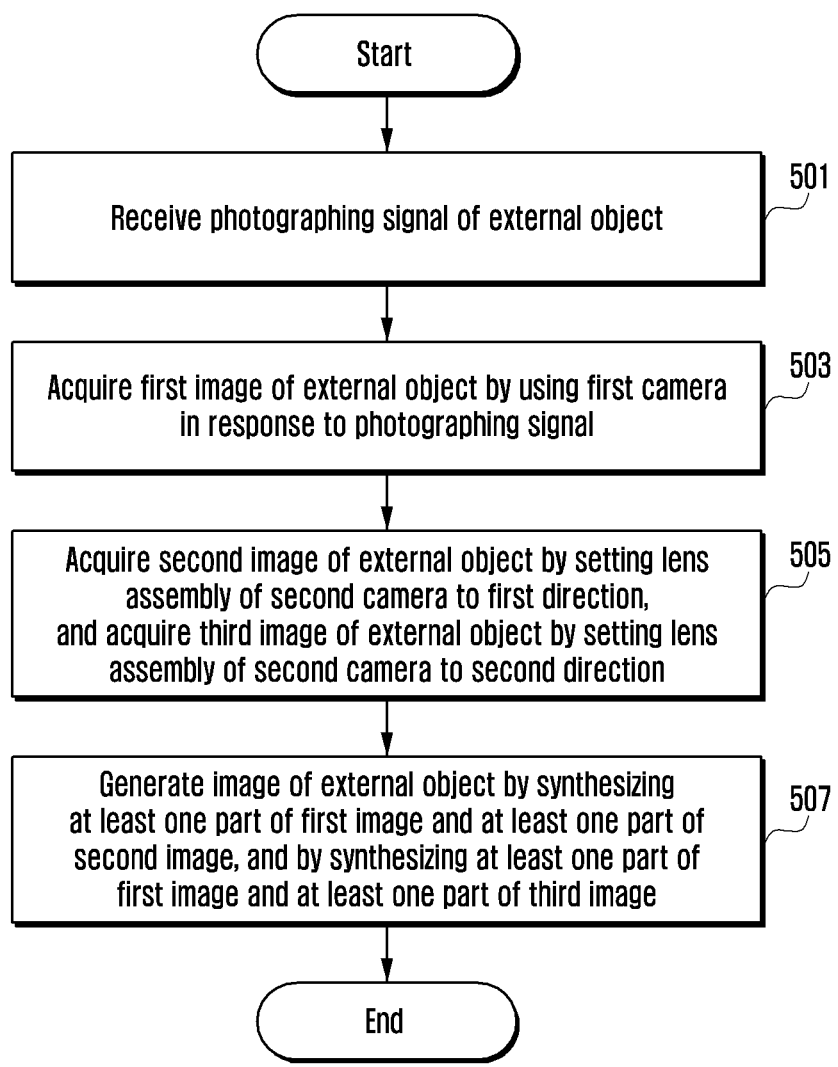
FIG. 5 is a flowchart illustrating a method for processing an image according to an embodiment of the present disclosure.

FIG. 5 is a flowchart illustrating a method for processing an image according to an embodiment of the present disclosure.

With reference to FIG. 5, the processor (e.g., image signal processor 260 of FIG. 2 or processor 350 of FIG. 3) can display an image of an external object received from a camera module (e.g., camera module 340 of FIG. 3) in a preview screen.

According to an embodiment, at operation 501, the processor receives a photographing signal of the external object (e.g. a user input).

According to an embodiment, the processor can receive an input requesting photography of the external object at operation 501, and further receive an input of a zoom level.

According to an embodiment, the processor can photograph an image of the external object in response to the received photographing signal.

According to an embodiment, at operation 503, the processor acquires a first image of the external object by using a first camera (e.g., first camera 410 of FIG. 4).

According to an embodiment, as described above, the first camera may include a wide angle lens and can obtain the first image of the external object having a wide view angle through the wide angle lens.

According to an embodiment, at operation 505, the processor acquires a second image of the external object by setting the second camera lens assembly of a second camera (e.g., second camera lens assembly 421 of FIG. 4) to a first direction using a driving unit (e.g., driving unit 433 of FIG. 4). The processor may further acquire a third image of the external object by setting the second camera lens assembly to a second direction through the driving unit.

According to an embodiment, the driving unit may include an image stabilizer (e.g., image stabilizer 240 of FIG. 2). The processor can adjust the angle of the second camera lens assembly by using the image stabilizer.

According to an embodiment, the second camera (e.g., second camera 420 of FIG. 4) may include a telephoto lens. Thus, the processor can acquire images of the external object having view angles narrower than the image of the first camera. For example, the second and third images of the external object corresponding to the first and second directions of the second camera lens assembly, respectively, may be telephoto images.

According to an embodiment, the operation 503 of acquiring the first image from the first camera and the operation 505 of acquiring the second and third images can be performed at the same time.

The operation 505 will be described in more detail with reference to FIGS. 7 and 8.

According to an embodiment, at operation 507, the processor may generate an image of the external object by synthesizing at least one part of the first image and at least one part of the second image and by synthesizing at least other one part of the first image and at least one part of the third image.

The operation 507 will be described in more detail with reference to FIGS. 6, 9, and 10.

Figure 6:
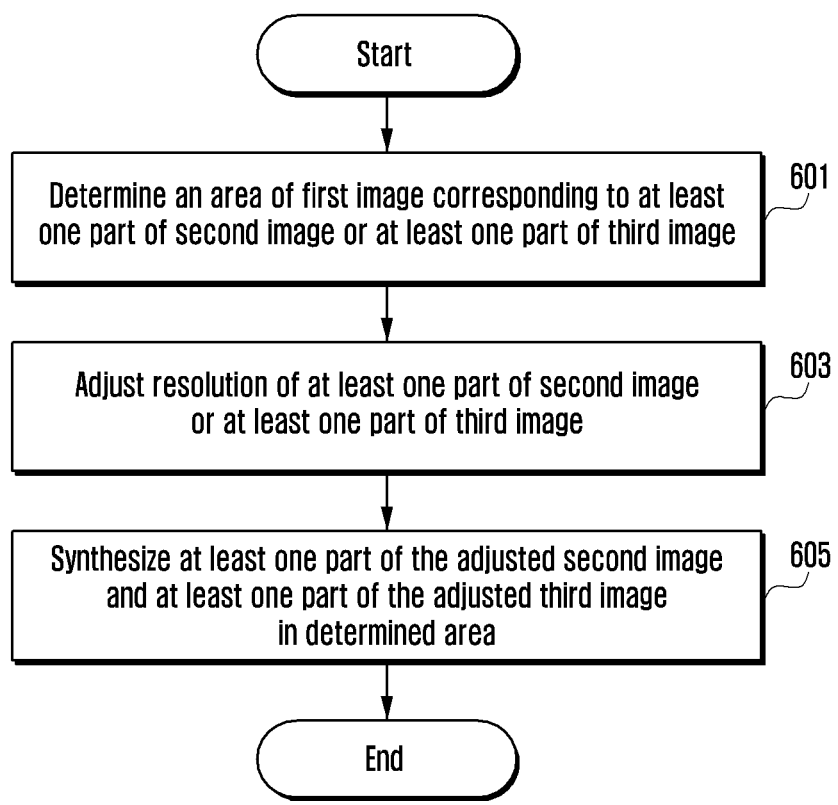
FIG. 6 is a flowchart illustrating a method for processing an image according to an embodiment of the present disclosure.

FIG. 6 is a flowchart illustrating a method for processing an image according to an embodiment of the present disclosure.

FIG. 6 illustrates more detailed operations for operation 507 of FIG. 5. The operation involves synthesizing an image acquired from a first camera (e.g., first camera 410 of FIG. 4) and images acquired from a second camera (e.g., second camera 420 of FIG. 4).

With reference to FIG. 6, at operation 601, the processor (e.g., image signal processor 260 of FIG. 2 or processor 350 of FIG. 3) determines an area of the first image acquired by using the first camera, where the area corresponds to at least one part of the second image or at least one part of the third image acquired by using the second camera.

According to an embodiment, at operation 603, the processor adjusts a resolution of at least one part of the second image or at least one part of the third image.

According to an embodiment, at operation 605, the processor synthesizes at least one part of the adjusted second image or at least one part of the adjusted third image adjusted in the area of the first image corresponding to at least one part of the second image and at least one part of the third image, as determined at operation 601.

According to an embodiment, the processor can scale up the first image and/or scale down the second and third images. The processor can synthesize at least one part of the scaled up first image and at least one part of the scaled down second image, and it can synthesize at least one other part of the scaled up first image and at least one part of the scaled down third image.

FIG. 7 illustrates a method for adjusting a direction of a second camera lens assembly corresponding to a location of an external object according to an embodiment of the present disclosure.

With reference to FIG. 7, as shown by reference number 710, the processor (e.g., image signal processor 260 of FIG. 2 or processor 350 of FIG. 3) can acquire a first image 711 of an external object 715 from a first camera (e.g., first camera 410 of FIG. 4). The processor can calculate the pixel movement value of at least one image (e.g., second image 713) acquired from the second camera (e.g., second camera 420 of FIG. 4) based on a zoom level of the first image 711 and a location of the external object 715 (e.g., distance information between first camera and external object 715). The pixel movement value may indicate, for example, the distance between pixels in the first image and the second image that correspond to the same portion of the external object.

According to an embodiment, the processor can calculate an angle of the second camera lens assembly (e.g., second camera lens assembly 421 of FIG. 4) based on the movement value. Based on the calculated angle, the processor can adjust the first angle 723 of the second camera lens assembly 721 as shown by reference number 720 to the second angle 731 as shown by reference number 730.

According to an embodiment, the processor can compensate vibration errors (e.g., hand vibration) using a location sensor (e.g., location sensor 431 of FIG. 4) at the calculated angle of the second camera lens assembly. For example, the processor can move the image sensors of the camera in a specific direction or adjust the read-out timing of the camera in order to compensate for the vibration.

Figure 8:
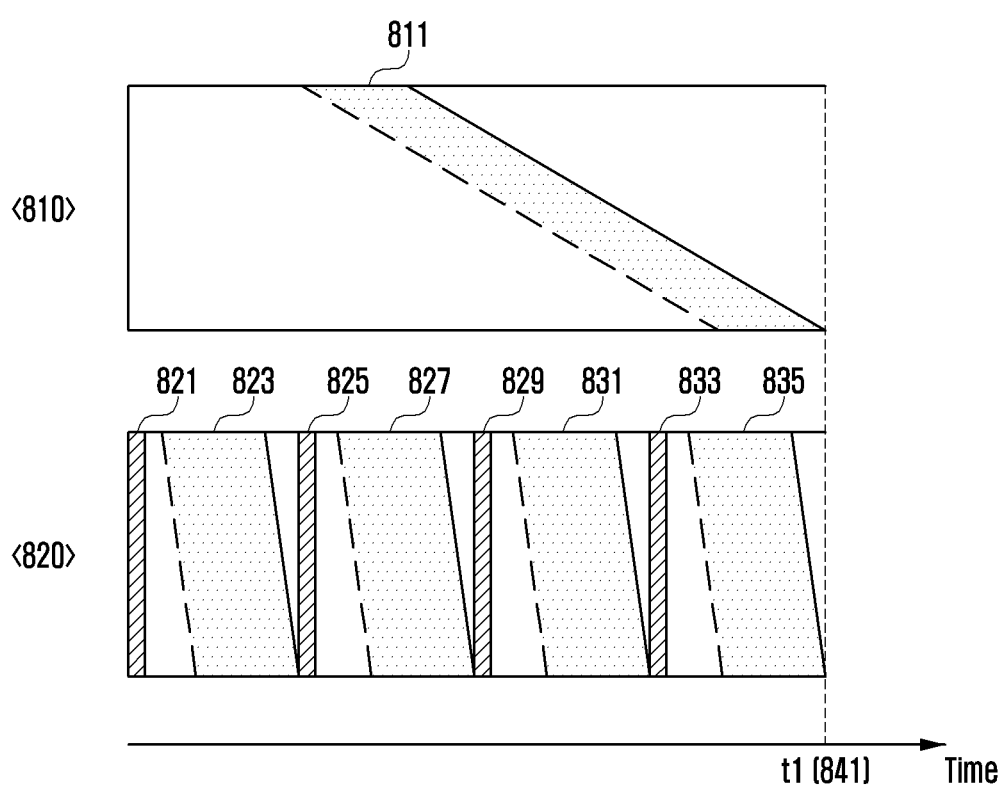
FIG. 8 illustrates a method for setting an acquiring speed of an image from an external object according to an embodiment of the present disclosure.

FIG. 8 illustrates a method for setting an acquiring speed of an image from an external object according to an embodiment of the present disclosure.

According to an embodiment of the present disclosure, the processor (e.g., image signal processor 260 of FIG. 2 or processor 350 of FIG. 3) can acquire a first image of an external object from a first camera (e.g., first camera 410 of FIG. 4) in response to a signal requesting photography of the external object. Further, the processor can acquire a plurality of images of the external object from a second camera (e.g., second camera 420 of FIG. 4) in response to the same signal. For example, the processor can acquire a plurality of images of the external object using the second camera, where each image corresponds to different angles of the second camera lens assembly (e.g., second camera lens assembly 421 of FIG. 4) adjusted by a driving unit (e.g., driving unit 433 of FIG. 4).

Thus, according to an embodiment, in response to a signal requesting photography of the external object, the processor can acquire a plurality of images of the external object from the second camera corresponding to different angles while an image of the external object is acquired from the first camera.

According to an embodiment, the processor can move the second camera lens assembly during the read-out time of the image sensor (e.g. image sensor 230 in FIG. 2).

For example, with reference to FIG. 8, reference number 810 illustrates an operation of acquiring an image of an external object from the first camera, and reference number 820 illustrates an operation of acquiring a plurality of images of the external object from the second camera that correspond to different angles of the second camera lens assembly.

According to an embodiment, as shown by reference number 810, the processor can acquire the first image from the first camera for an exposure time 811. For example, the first image may be a wide angle image including the external object.

According to an embodiment, as shown by reference number 820, the processor can control the second camera lens assembly to move to a first angle, time for which is shown by reference number 821 in response to the signal requesting photography. The processor can acquire a second image of the external object from the second camera for a first exposure time 823 corresponding to the first angle. The processor can control the second camera lens assembly to move to a second angle, time for which is shown by reference number 825. The processor can acquire a third image of the external object from the second camera for a second exposure time 827 corresponding to the second angle. The processor can control the second camera lens assembly to move to a third angle, time for which is shown by reference number 829. The processor can acquire a fourth image of the external object from the second camera for a third exposure time 831 corresponding to the third angle. The processor can control the second camera lens assembly to move to a fourth angle, time for which is shown by reference number 833. The processor can acquire a fifth image of the external object from the second camera for a third exposure time 835 corresponding to the fourth angle. For example, the second to fifth images, corresponding to the first to fourth angles, may be telephoto images acquired by zooming in on the external object.

According to an embodiment, the present disclosure can acquire a plurality of images (e.g., second image to fifth image) of the external object corresponding to different angles of a second lens assembly, as shown by reference number 820. Acquisition of the plurality of images via the second camera may be done while the first image of the external object is acquired from the first camera as shown by reference number 810. Acquisition by the first camera and acquisition by the second camera may both be finished by time t1 841.

According to an embodiment, the processor can reduce the time required for acquiring the second to fifth images so that acquisition of the second to fifth images from the second camera can be done at the same time the first image is acquired from the first camera. For example, the processor can adjust the exposure time (e.g., 823, 827, 831, and 835) for acquiring the second to fifth images to be shorter than a predefined exposure time.

According to an embodiment, by adjusting the exposure time for acquiring the second to fifth images from the second camera, the processor can prevent differences in the acquisition times between acquiring the first image from the first camera and acquiring the second to fifth images. Further, by adjusting the exposure time for acquiring the second to fifth images from the second camera, deterioration of image quality due to time delay can be avoided because the second to fifth images can be acquired from the second camera while the first image is being acquired from the first camera.

According to an embodiment, the processor can control the first camera so that the first camera acquires, in this example, four images of the external object successively while the second camera acquires the second to fifth images for each exposure time (e.g., 823, 827, 831, and 835).

According to an embodiment, the processor can perform multi frame noise reduction for the four images of the external object acquired from the first camera. Accordingly, the processor can acquire images of the external object with reduced noise.

According to an embodiment, the processor can synthesize the four images of the external object acquired from the first camera (or one image synthesized by the multi frame noise reduction) and the second to fifth images of the external object acquired from the second camera corresponding to the different angles of the second camera lens assembly.

According to an embodiment, the processor can prevent differences in acquisition times between acquiring an image from the first camera and acquiring images from the second camera by controlling the first camera to acquire, for example, four successive images of the external object, each image captured during the exposure times (e.g., 823, 827, 831, and 835) for acquiring the second to fifth images from the second camera.

Figure 9:
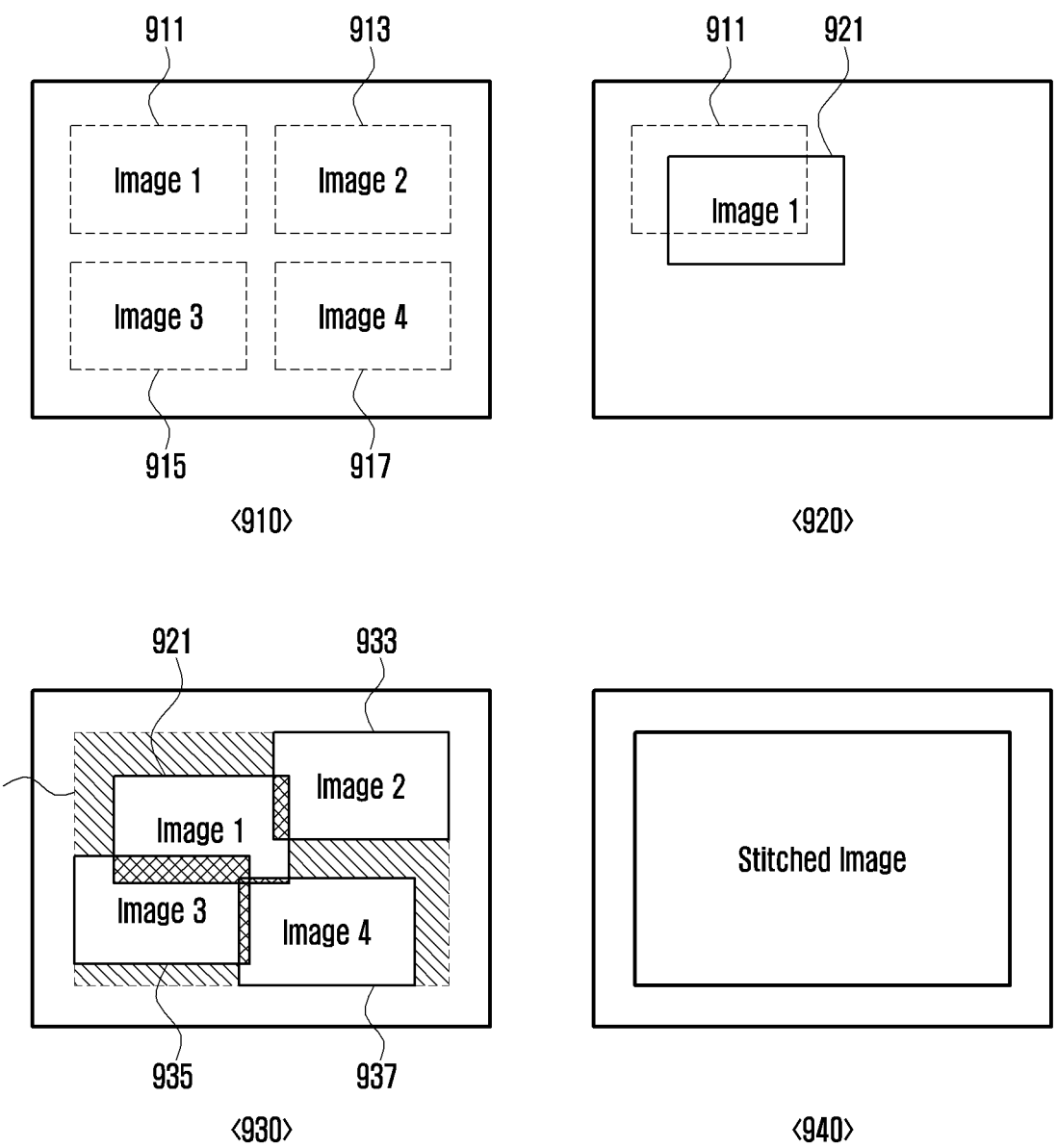
FIG. 9 illustrates a method for matching and stitching a plurality of images acquired from a second camera according to an embodiment of the present disclosure.

FIG. 9 illustrates a method for matching and stitching a plurality of images acquired from a second camera according to an embodiment of the present disclosure.

With reference to FIG. 9, as shown by reference number 910, the processor can acquire first to fourth images 911, 913, 915, and 917 of an external object through a second camera corresponding to first to fourth angles of a second camera lens assembly of the second camera.

According to an embodiment, the processor can determine locations of the first to fourth images 911, 913, 915, and 917 by analyzing the first to fourth images 911, 913, 915, and 917 in the context of an image area of an image acquired from a first camera (e.g., first camera 410 of FIG. 4). Based on XY coordinates of various subjects in the images, for example, the processor can calculate location differences between the first to fourth images 911, 913, 915, and 917 in the image area acquired from the first camera. If the calculated differences are smaller, the locations of the first to fourth images 911, 913, 915, and 917 may be determined to be close to each other.

For example, as shown by reference number 920, the processor can determine the location of the first image 911 in the image area acquired from the first camera as reference number 921. By the same method, the processor can determine the locations of the second to fourth images 913, 915, 917 as reference numbers 933, 935, and 937 in the image area acquired from the first camera as shown by reference number 930.

According to an embodiment, if the locations (coordinates) of the first to fourth images acquired from the second camera are determined in the image acquired from the first camera as shown by reference numbers 921, 933, 935, and 937, the processor can perform an operation of processing images (i.e., operation of matching images) for an area where the first to fourth images 921, 933, 935, and 937 overlap.

For example, if the first to fourth images 921, 933, 935, and 937 have overlapping areas (shown in reference number 930 as crisscrossed hatching), the processor can perform an operation of removing duplicates of the overlapping areas from the plurality of images. The processor can further perform an image processing operation of providing an image 939 for the area where the first to fourth images 921, 933, 935, and 937 do not exist (shown in reference numeral 930 as single diagonal hatching) by using the corresponding portions of the image acquired from the first camera.

According to an embodiment, after matching the first to fourth images 921, 933, 935, and 937, the processor can generate one image by performing an operation of stitching the matched first to fourth images 921, 933, 935, and 937 as shown by reference number 940.

According to an embodiment, the processor can synthesize the image 939 acquired from the first camera and the image combined through the stitching operation. For example, the processor can synthesize at least one part of the image 939 (e.g., first area of image 939) and at least one part of the first image 921, at least one other part of the image 939 (e.g., second area of image 939) and at least one part of the second image 933, at least one further part of the image 939 (e.g., third area of image 939) and at least one part of the third image 935, and at least another further part of the image 939 (e.g., fourth area of image 939) and at least one part of the fourth image 937.

According to an embodiment, the processor can remove artifacts by removing unnatural effects such as boundaries caused by the synthesis by applying a filter.

Figure 10:
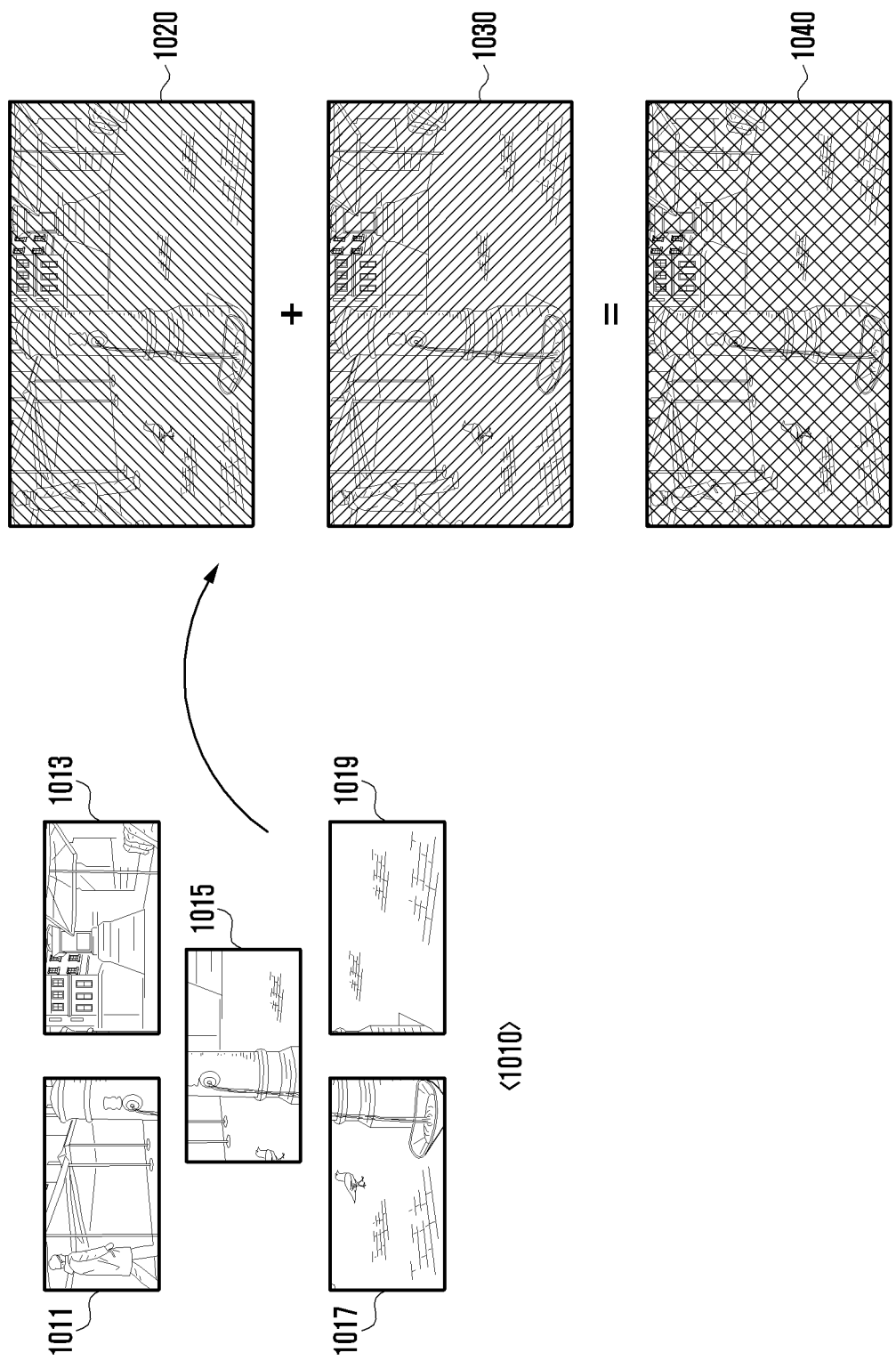
FIG. 10 illustrates a method for processing an image according to an embodiment of the present disclosure.

FIG. 10 illustrates a method for processing an image according to an embodiment of the present disclosure.

With reference to FIG. 10, as shown by reference number 1010, the processor (e.g., image signal processor 260 of FIG. 2 or processor 350 of FIG. 3) can acquire a plurality of images 1011, 1013, 1015, 1017, and 1019 of an external object from a second camera (e.g., second camera 420 of FIG. 4) corresponding to different angles of a second camera lens assembly (e.g., second camera lens assembly 421 of FIG. 4). For example, the plurality of images 1011, 1013, 1015, 1017, and 1019 may be telephoto images corresponding to different angles.

According to an embodiment, the processor can generate one image 1020 by performing an operation of stitching the plurality of acquired images 1011, 1013, 1015, 1017, and 1019.

According to an embodiment, the processor can generate an image 1040 by synthesizing the generated image 1020 and an image 1030 of the external object acquired from a first camera (e.g., first camera 410 of FIG. 4).

The stitching operation and the synthesizing operation have been already described in FIG. 9, and a detailed description of the operations will be omitted here.

As described above, in case of photographing an expanded image (e.g. a wide angle image), the system according to at least one embodiment of the present disclosure can provide a zooming effect having the same image quality as an image acquired from a camera having a medium view angle, without using a camera having the medium view angle. This may be accomplished by synthesizing a wide angle image acquired from a first camera and a plurality of telephoto images acquired from a second camera, where the plurality of images from the second camera correspond to different angles of a second camera lens assembly.

Figure 11:
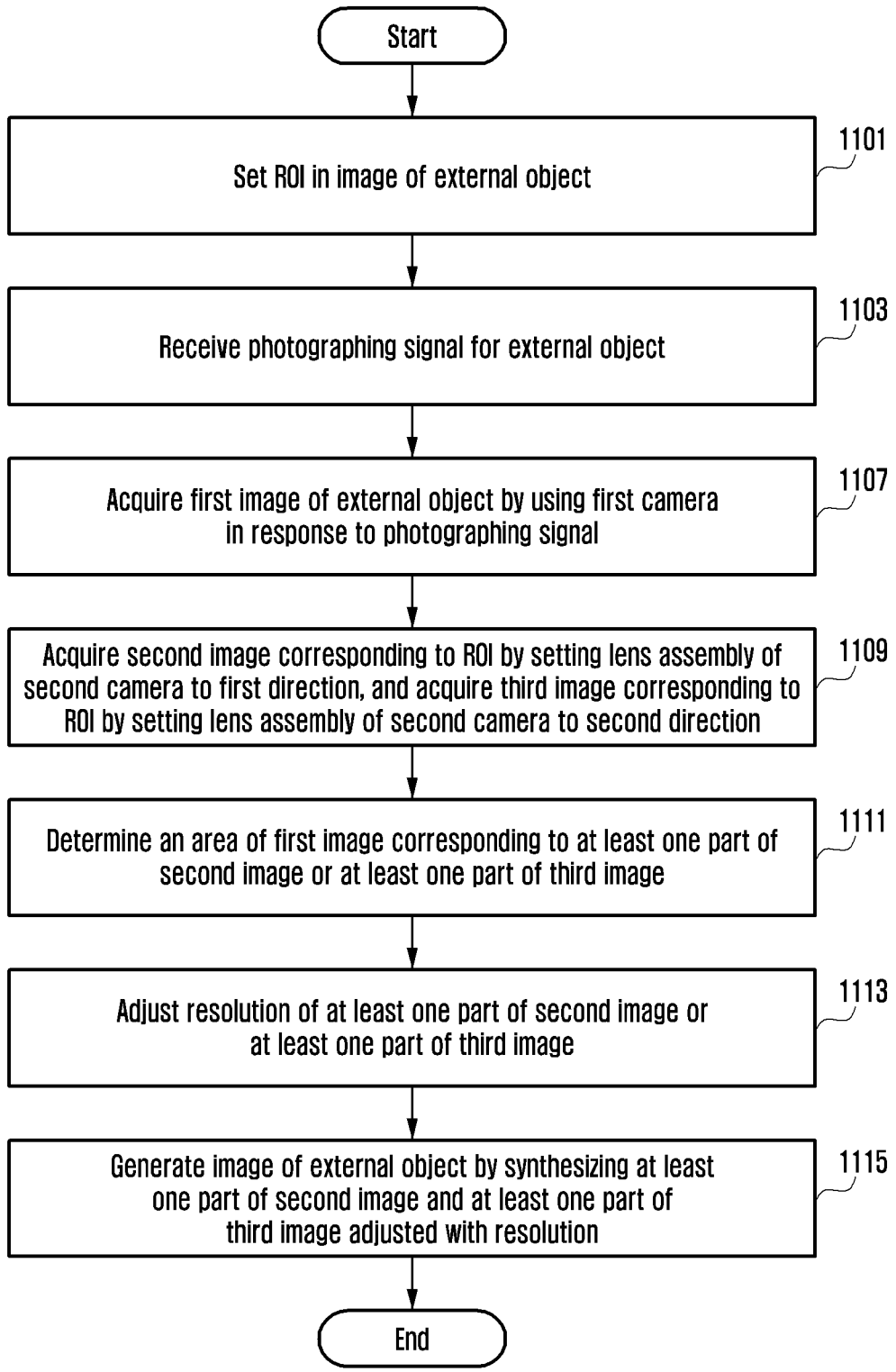
FIG. 11 is a flowchart illustrating a method for processing an image according to an embodiment of the present disclosure.
Figure 12:
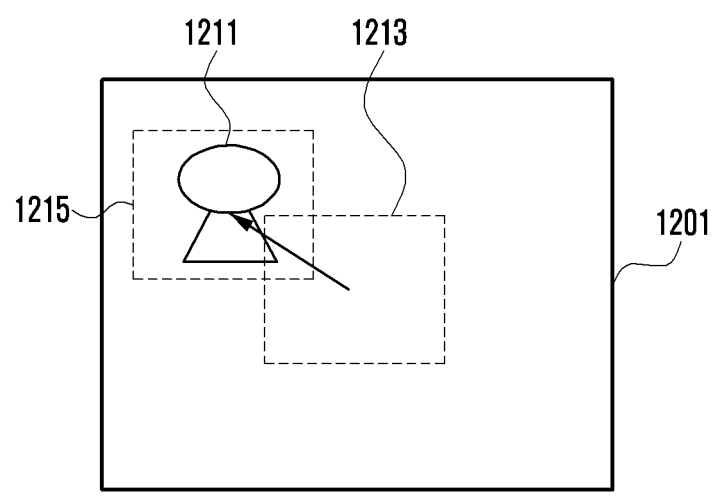
FIG. 12 illustrates a method for processing an image according to an embodiment of the present disclosure.

The following FIGS. 11 and 12 illustrate a method of improving image quality for an area corresponding to a region of interest (ROI) rather than for the whole area of the image.

FIG. 11 is a flowchart illustrating a method for processing an image according to an embodiment of the present disclosure.

With reference to FIG. 11, the processor (e.g., image signal processor 260 of FIG. 2 or processor 350 of FIG. 3) can display an image including an external object received from a camera module in a preview screen.

According to an embodiment, at operation 1101, the processor sets an ROI in the preview screen including the external object. For example, if the external object is a person, the ROI can be set automatically by recognizing a face or a hand. Alternatively, the processor can set the ROI in response to a user input for setting the ROI in the preview screen.

According to an embodiment, at operation 1103, the processor receives a photographing signal for the external object.

According to an embodiment, the processor can further receive an input of a zoom level in addition to the photographing signal for the external object at operation 1103.

According to an embodiment, at operation 1107, the processor acquires a first image of the external object by using a camera (e.g., first camera 410 of FIG. 4) in response to the received photographing signal.

According to an embodiment, at operation 1109, the processor acquires a second image from a second camera (e.g., second camera 420 of FIG. 4) for the ROI corresponding to a first direction of a second camera lens assembly (e.g., second camera lens assembly 421 of FIG. 4). The angle of the second camera lens assembly may be adjusted by a driving unit (e.g., driving unit 433 of FIG. 4). The processor also acquires a third image for the ROI corresponding to a second direction of the second camera lens assembly.

According to an embodiment, the operation 1107 of acquiring the first image from the first camera and the operation 1109 of acquiring the second and third images can be performed at the same time.

According to an embodiment, at operation 1111, the processor determines an area of the first image acquired from the first camera that corresponds to at least one part of the second image or at least one part of the third image acquired from the second camera.

According to an embodiment, at operation 1113, the processor adjusts the resolution of at least one part of the second image or at least one part of the third image. At operation 1115, the processor generates an image of the external object by synthesizing at least one part of the adjusted second image or at least one part of the adjusted third image in the area of the first image determined at operation 1111.

FIG. 12 illustrates a method for processing an image according to an embodiment of the present disclosure.

With reference to FIG. 12, the processor (e.g., image signal processor 260 of FIG. 2 or processor 350 of FIG. 3) can set an ROI in a preview screen 1201 to include the external object. The ROI can be recognized automatically or be selected by a user. In FIG. 12, the ROI 1211 corresponds to a specific object.

For example, the processor can adjust a second camera lens assembly (e.g., second camera lens assembly 421 of FIG. 4) from a first angle 1213 to a second angle 1215 using a driving unit (e.g., driving unit 433 of FIG. 4) of a second camera (e.g., second camera 420 of FIG. 4) in order to acquire an image for the ROI 1211. The processor can acquire at least one image from the second camera for the ROI corresponding to a second angle 1215 adjusted by the driving unit. The processor can synthesize at least one image for the ROI with an image of the specific object acquired from a first camera (e.g., first camera 410 of FIG. 4).

As described above, in case of photographing an expanded image, the system according to at least one embodiment of the present disclosure can provide a zoom function having improved image quality for an ROI. This may be accomplished through an operation of synthesizing a wide angle image acquired from a first camera and at least one telephoto image acquired from a second camera for the ROI, where the telephoto image corresponds to an angle of a second camera lens assembly.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that the singular form of a noun may also refer to the plural, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together. As used herein, such terms as "1st" and "2nd," or "first" and "second" may refer to corresponding components without implying an order of importance, and are used merely to distinguish each component from the others without unduly limiting the components. It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly via a wire, wirelessly, or via a third element.

As used herein, the term "module" may include a unit implemented in hardware, software, or firmware, and may interchangeably be used with other terms, for example, "logic," "logic block," "part," or "circuitry." A module may be a single integral component or a part thereof adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include code made by a complier or code executable by an interpreter. The machine-readable storage medium may be provided in the form of a non-transitory storage medium. The term "non-transitory" simply means that the storage medium is a tangible device and does not include a signal (e.g., an electromagnetic wave). However this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the present disclosure, in the case of photographing an expanded image, the electronic device can provide an image having improved quality in a medium view angle zoom range. The electronic device may include a plurality of cameras having different view angles, and the above may be accomplished through the operations of synthesizing an image of an external object acquired from a first camera and a plurality of images of the external object acquired from a second camera, where the plurality of images from the second camera correspond to different angles of a second camera lens assembly of the second camera.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a first camera;
a second camera including a lens assembly and a driving unit capable of changing an optic axis direction of the lens assembly by adjusting an angle of the lens assembly; and
a processor, wherein the processor is configured to:
receive a photographing signal for an external object,
acquire a first image of the external object by using the first camera,
acquire a second image of the external object by setting the lens assembly of the second camera to a first direction,
acquire a third image of the external object by setting the lens assembly of the second camera to a second direction, wherein the lens assembly of the second camera is moved from pointing in the first direction to pointing in the second direction between an exposure time for acquiring the second image and a read-out time of an image sensor of the second camera, and
generate an image of the external object by synthesizing at least one part of the first image with at least one part of the second image, and synthesizing at least one other part of the first image with at least one part of the third image.

2. The electronic device of claim 1, wherein a view angle characteristic of the second camera is narrower than a view angle characteristic of the first camera.

3. The electronic device of claim 1, wherein, in the generation of the image of the external object, the processor is further configured to:
determine an area of the first image corresponding to at least one part of the second image or at least one part of the third image,
adjust a resolution of the at least one part of the second image or the at least one part of the third image, and
synthesize the adjusted at least one part of the second image or the adjusted at least one part of the third image in the determined area.

4. The electronic device of claim 3, wherein the processor is further configured to:
expand a size of the first image and/or reduce a size of the second image or the third image,
match at least one part of the reduced second image with at least one part of the reduced third image,
generate a fourth image by stitching the matched at least one part of the second image with the matched at least one part of the third image, and
synthesize the fourth image with at least one part of the first image.

5. The electronic device of claim 1, wherein the processor is further configured to, for a predetermined time, acquire the first image by using the first camera, and acquire the second image and the third image by using the second camera.

6. The electronic device of claim 5, wherein the processor is further configured to:
control the first camera and the second camera to acquire the first image, the second image, and the third image for the predetermined time by adjusting an exposure time for acquiring the second image and the third image to be shorter than a predefined exposure time, or
control the second camera to acquire the second image and the third image according to the exposure time, and control the first camera to acquire a plurality of images as the first image, wherein an exposure time for each of the plurality of images corresponds to the exposure time of the second image and the third image.

7. The electronic device of claim 1, wherein the driving unit comprises an image stabilizer, and
the processor is further configured to adjust the second camera in the first direction or the second direction at least by using the image stabilizer.

8. The electronic device of claim 1, wherein the processor is further configured to acquire distance information between the first camera and the external object based on the first image, and
control the driving unit to adjust the angle of the lens assembly of the second camera based on the acquired distance information.

9. The electronic device of claim 1, wherein the processor is further configured to:
receive an input for setting a region of interest (ROI), and
control the second camera based at least in part on the ROI.

10. The electronic device of claim 9, wherein the second image and the third image are acquired according to the ROI.

11. An image processing method of an electronic device by using a plurality of cameras, the image processing method comprising:
acquiring a first image of an external object with a first camera in response to a photographing signal for the external object;
acquiring a second image of the external object with a second camera, wherein the second image is acquired by setting a lens assembly of the second camera to a first direction using a driving unit included in the second camera, the driving unit capable of changing an optic axis direction of the lens assembly by adjusting an angle of the lens assembly;
acquiring a third image of the external object, wherein the third image is acquired by setting the lens assembly of the second camera to a second direction, wherein the lens assembly of the second camera is moved from pointing in the first direction to pointing in the second direction between an exposure time for acquiring the second image and a read-out time of an image sensor of the second camera; and
generating an image of the external object by synthesizing at least one part of the first image with at least one part of the second image, and synthesizing at least one other part of the first image with at least one part of the third image.

12. The method of claim 11, wherein a view angle characteristic of the second camera is narrower than a view angle characteristic of the first camera.

13. The method of claim 11, wherein generating the image of the external object further comprises:
determining an area of the first image corresponding to at least one part of the second image or at least one part of the third image;
adjusting a resolution of at least one part of the second image or at least one part of the third image; and
synthesizing the adjusted at least one part of the second image or the adjusted at least one part of the third image in the determined area.

14. The method of claim 13, further comprising:
expanding a size of the first image and/or reducing a size of the second image or the third image;
matching at least one part of the reduced second image with at least one part of the reduced third image;
generating a fourth image by stitching the matched at least one part of the matched second image with the matched at least one part of the third image; and
synthesizing the fourth image with at least one part of the first image.

15. The method of claim 11, further comprising:
acquiring the first image, the second image, and the third image for a predetermined time.

16. The method of claim 15, further comprising:
controlling the first camera and the second camera to acquire the first image, the second image, and the third image for the predetermined time by adjusting an exposure time for acquiring the second image and the third image to be shorter than a predefined exposure time, or
controlling the second camera to acquire the second image and the third image according to the exposure time, and controlling the first camera to acquire a plurality of images as the first image, wherein an exposure time for each of the plurality of images corresponds to the exposure time of the second image and the third image.

17. The method of claim 11, wherein the driving unit comprises an image stabilizer, and
the first direction or the second direction is set at least by using the image stabilizer.

18. The method of claim 11, further comprising:
acquiring distance information between the first camera and the external object based on the first image; and
controlling the driving unit to adjust the angle of the lens assembly of the second camera based on the acquired distance information.

19. The method of claim 11, further comprising:
receiving an input for setting a region of interest (ROI), and
controlling the second camera based at least in part on the ROI.

20. The method of claim 19, wherein the second image and the third image are acquiring according to the ROI.

* * * * *